(12) United States Patent
Yamamoto et al.

(10) Patent No.: US 7,312,169 B2
(45) Date of Patent: Dec. 25, 2007

(54) OPTICAL GLASS FOR PRECISION MOLDING

(75) Inventors: Yoshinori Yamamoto, Saitama-ken (JP); Naruhito Sawanobori, Saitama-ken (JP); Shinobu Nagahama, Saitama-ken (JP)

(73) Assignee: Sumita Optical Glass, Inc., Saitama-Ken (JP)

( * ) Notice: Subject to any disclaimer, the term of this patent is extended or adjusted under 35 U.S.C. 154(b) by 404 days.

(21) Appl. No.: 10/980,280

(22) Filed: Nov. 4, 2004

(65) Prior Publication Data
US 2005/0159290 A1 Jul. 21, 2005

(30) Foreign Application Priority Data
Jan. 15, 2004 (JP) ............................. 2004-007621

(51) Int. Cl.
*C03C 3/19* (2006.01)
(52) U.S. Cl. .............................. 501/45; 501/46; 501/47; 501/48; 501/901
(58) Field of Classification Search ................ 501/45, 501/901, 46, 47, 48
See application file for complete search history.

(56) References Cited

U.S. PATENT DOCUMENTS

| 4,115,131 | A | * | 9/1978 | Ishibashi et al. | ............. | 501/42 |
| 4,193,807 | A | * | 3/1980 | Ishibashi et al. | ............. | 501/45 |
| 4,996,173 | A | * | 2/1991 | Tachiwana | ................. | 501/73 |
| 6,333,282 | B1 | * | 12/2001 | Nakahata et al. | ............. | 501/45 |
| 2004/0266602 | A1 | * | 12/2004 | Fujiwara et al. | ............. | 501/46 |

FOREIGN PATENT DOCUMENTS

| EP | 1468974 A2 | * | 10/2004 |
| JP | 01-308843 | | 12/1989 |
| JP | 07-247135 | | 9/1995 |
| JP | 07-247136 | | 9/1995 |
| JP | 08-157231 | | 6/1996 |
| JP | 10-316448 | | 12/1998 |
| JP | 2001-58845 | | 3/2001 |
| JP | 2007015904 A | * | 1/2007 |

OTHER PUBLICATIONS

Derwent Abstract 2007-165950, english Abstract of JP 2007-015904 A.*

* cited by examiner

*Primary Examiner*—J. A. Lorengo
*Assistant Examiner*—Elizabeth A Bolden
(74) *Attorney, Agent, or Firm*—McDermott Will & Emery LLP

(57) ABSTRACT

The present invention provides a high refractive index, high dispersion optical glass for precision molding, being free from harmful materials causing environmental problems, such as lead oxide, etc., and having a low yield temperature, a refractive index (nd) of at least 1.83 and an Abbe number (vd) of at most 26.0 and further providing a low softening property as well as an improved mass production property with less coloration, which is represented in terms of for making up the glass, by the following chemical composition (wt %):

| | |
|---|---|
| $P_2O_5$ | 15 to 29% |
| $B_2O_3$ | 0 to 2% |
| $GeO_2$ | 0 to 14% |
| Sum of $P_2O_5 + B_2O_3 + GeO_2$ | 20 to 35% |
| $Li_2O$ | 0 to 5% |
| $Na_2O$ | 3 to 14% |
| $K_2O$ | 0 to 9% |
| Sum of $Li_2O + Na_2O + K_2O$ | 5 to 15% |
| $Nb_2O_5$ | 2 to less than 22% |
| $Bi_2O_3$ | 34 to 60% |
| $WO_3$ | 0 to 5% |
| BaO | 0 to 5% |
| $In_2O_3$ | 0 to 7%. |

2 Claims, 2 Drawing Sheets

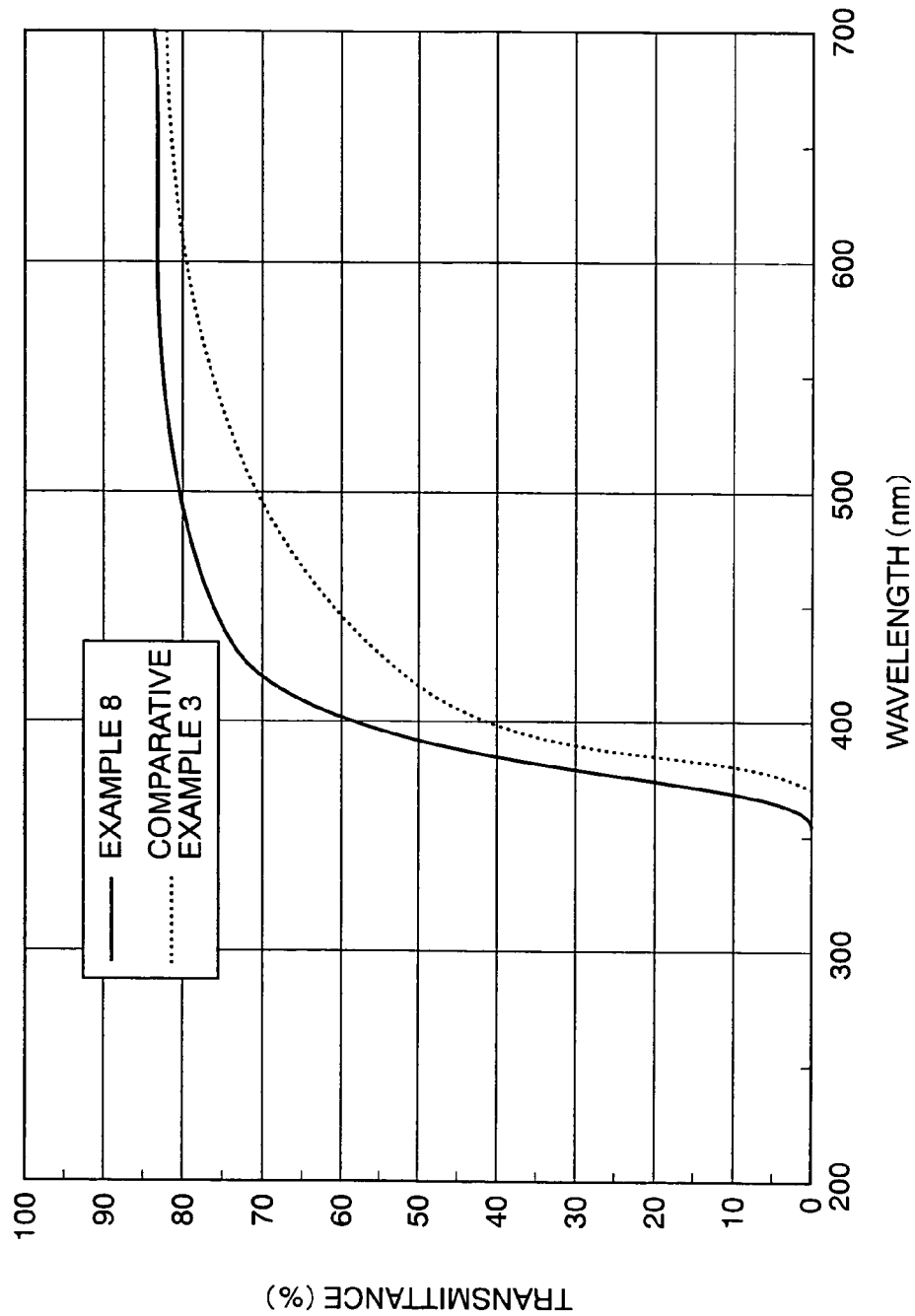

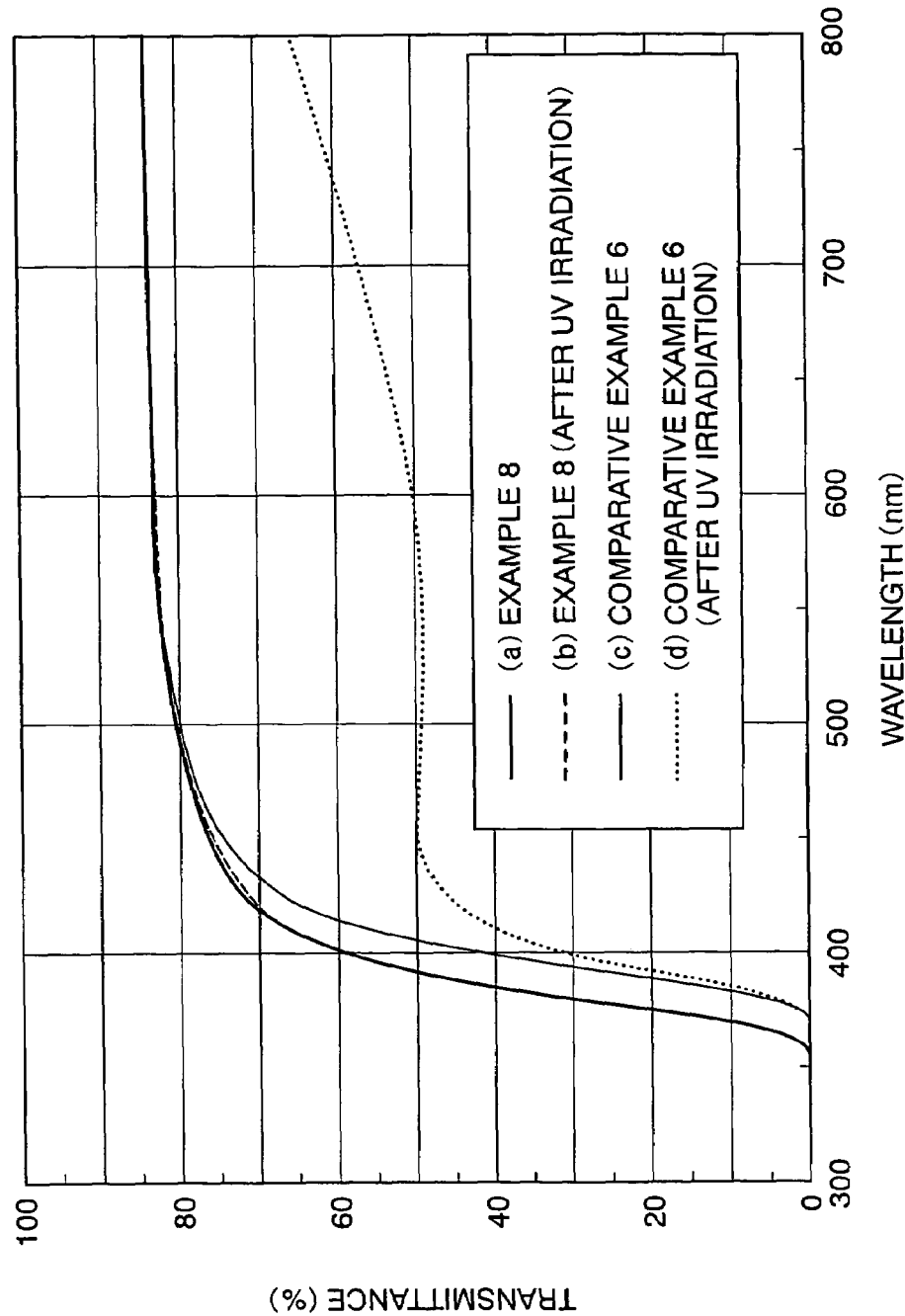

OPTICAL GLASS FOR PRECISION MOLDING

BACKGROUND OF THE INVENTION

1. Field of the Invention

This invention relates to an optical glass for precision molding, capable of carrying out a precision molding at a low temperature and needing no polishing and grinding after the precision molding.

2. Description of the Prior Art

Since the prior art optical glass of SF type (high refractive index, high dispersion) containing a large amount of lead oxide in the glass composition is very stable and has a relatively low softening point, the precision molding thereof is carried out at a low temperature zone. JP-A-1-308843 discloses a glass composition containing a large amount of lead oxide, rendered feasible at a further low temperature as an optical glass of SF type for precision molding. JP-A-7-247135 and JP-A-7-247136 disclose glasses of $P_2O_5$—PbO—$Nb_2O_5$—$WO_3$-alkali metal oxide type each containing a large amount of lead oxide and JP-A-8-157231 discloses $P_2O_5$—$B_2O_3$—$Nb_2O_5$—$WO_3$-alkali metal oxide type. Furthermore, JP-A-10-316448 discloses a glass of $P_2O_5$—$B_2O_3$—$Nb_2O_5$—$WO_3$-alkali metal oxide type and JP-A-2001-058845 discloses a glass of $P_2O_5$—$Nb_2O_5$—$Bi_2O_3$—$Na_2O$ type.

However, the precision molding is generally carried out in a reducing atmosphere so as to prevent a mold from oxidation, so if lead oxide is contained in the glass composition, the lead oxide on the glass surface is reduced and deposited as lead on the surface of a precision molding lens. The lead is evaporated by heating for the precision molding, a part of which adheres to the surface of the mold material to form a convex part which is then transferred to the surface of the precision molding lens as it is. When such steps are continuously repeated, the surface accuracy of the precision molding lens cannot be maintained, so that not only such optical properties as designed can not be obtained, but also an operation for removing the lead adhered to the mold is required. This is not suitable for mass production of the lenses. Furthermore, because of containing lead oxide in large amounts, the specific gravity is increased and thus, there arises another problem that weight-lightening of an optical part is difficult in which these lenses are incorporated. Accordingly, the glasses disclosed in the foregoing JP-A-1-308843, JP-A-7-247135 and JP-A-7-247136 are not suitable, nor practically used as an optical glass for precision molding.

On the other hand, in a glass described in JP-A-8-157231, surely, lead oxide is not incorporated, but in place of the lead oxide, $TiO_2$ is all incorporated, although claimed as an optional component, in order to obtain high refractive index, high dispersion properties as shown in Examples 7 to 11 of the second embodiment of the present invention. Consequently, the resulting glass is very strongly colored. In the ordinary optical systems, use of a single glass lens is not realistic and many optical systems are substantially composed of a number of lenses. Thus, it is desired that coloration of these glass lenses is rendered as little as possible. Accordingly, the glass described in JP-A-8-157231 is substantially caused to have high referactive index, high dispersion properties by $TiO_2$, which cannot be said to be preferable from the standpoint of optical designing.

In the case of known mold materials for precision molding, there arises a problem that the higher is the precision molding temperature, the more is oxidation or deterioration of the mold material, thus resulting in difficulty in maintenance of the surface accuracy of the mold material and in mass production of lenses by the precision molding. On the other hand, the precision molding is generally carried out at a temperature of higher by 15 to 50° C. than the yield temperature (At) of the glass. That is, an optical glass to be subjected to precision molding must be precision molded at a temperature of as lower as possible and to this end, it is desired that the yield temperature (At) of the glass is as lower as possible.

In the foregoing JP-A-8-157231, however, there are no examples concerning a glass having a high refractive index, high dispersion properties [refractive index (nd) at least 1.83, Abbe number (vd) at most 26.0] and low softening property [yield temperature (At) at most 550° C.]. In this specification, the yield temperature is defined based on the measurement by TMA (Thermomechanical Analyzer).

The glass described in JP-A-10-316448 is an optical glass, the inventors have developed, of $P_2O_5$—$Nb_2O_5$—$TeO_2$-alkali metal oxide type, according to which a high refractive index and high dispersion [refractive index (nd) of at least 1.83 and Abbe number (vd) of at most 26.0] and low softening properties [yield temperature (At) at most 550° C.] can substantially be achieved, but in view of influences upon the ambient environment or the human body by $TeO_2$ contained in a glass composition, it is concluded that further improvements are required.

From the foregoing, the inventors have made various efforts for the purpose of providing a high refractive index and high dispersion, optical glass for precision molding, being free from coloring of the glass and excellent in mass production, and having a refractive index (nd) of at least 1.83 and an Abbe number (vd) of at most 26.0 and an effect of readily lowering the softening point of glass like lead oxide, tellurium oxide and further having low softening properties such as a yield temperature (At) of at most 550° C. without harmful components to the environment or human body, and consequently have reached an invention relating to a glass of $P_2O_5$—$Nb_2O_5$—$Bi_2O_3$—$Na_2O$ type as disclosed in JP-A-2001-058845.

However, the optical glass whose $P_2O_5$, $Nb_2O_5$, $Bi_2O_3$ and $Na_2O$ components are in the specified composition range as described in JP-A-2001-058845 has such a problem that it tends to be colored under irradiation of ultraviolet (UV) rays.

SUMMARY OF THE INVENTION

Accordingly, it is an object of the present invention to provide an optical glass for precision molding, capable of carrying out a precision molding at a low temperature, without needing polishing and grinding after the precision molding, whereby the above described problems of the prior art can be solved.

It is another object of the present invention to provide a high refractive index, high dispersion optical glass for precision molding, having excellent properties, i.e. refractive index (nd) of at least 1.83, Abbe number (vd) of at most 26.0 and effect of readily lowering the softening point of the glass such as by lead oxide or tellurium oxide, and further providing a low softening property shown by a yield temperature (At) of at most 550° C. as well as an improved mass production property with being less colored under irradiation of ultraviolet rays.

These objects can be attained by an optical glass for precision molding, in which $P_2O_5$, $Nb_2O_5$, $Bi_2O_3$ and $Na_2O$, the Sum of $P_2O_5+B_2O_3+GeO_2$ and the Sum of $Li_2O+Na_2O+K_2O$ are defined in the specified ranges.

BRIEF DESCRIPTION OF THE DRAWING

FIG. 1 is a graph showing a relationship between the wavelength (nm) and transmittance (%) for comparison of the coloration (transmittance) of optical glasses of Example 8 according to the present invention and Comparative Example 3.

FIG. 2 is a graph showing a relationship between the wavelength (nm) and transmittance (%) for comparison of the coloration (transmittance) of optical glasses of Example 8 according to the present invention and Comparative Example 6, before and after irradiation of ultraviolet rays.

DETAILED DESCRIPTION OF THE INVENTION

The inventors have made various efforts to achieve the above described objects and consequently have found that in a glass of $P_2O_5$—$Nb_2O_5$—$Bi_2O_3$—$Na_2O$ type, there is a composition capable of achieving the above described objects in an $Nb_2O_5$ content lower zone than the composition range described in JP-A-2001-058845. The present invention is based on finding this knowledge.

That is, according to the present invention, there is provided a high refractive index, high dispersion optical glass for precision molding, having excellent properties, i.e. refractive index (nd) of at least 1.83, preferably 1.83 to 1.90, Abbe number (vd) of at most 26.0, preferably 26.0 to 21.0 and further providing a low softening property shown by a yield temperature (At) of at most 550° C., preferably at most 540° C. as well as an improved mass production property with being less colored under irradiation of UV rays.

Specifically, the present invention relates to a high refractive index, high dispersion optical glass for precision molding, which is represented, in terms of atoms for making up the glass, by the following chemical composition (wt %):

|  |  | Preferred Range |
|---|---|---|
| $P_2O_5$ | 15.0 to 29.0% | 16.0 to 28.0% |
| $B_2O_3$ | 0 to 2.0% | 0 to 1.0% |
| $GeO_2$ | 0 to 14.0% | 0 to 13.5% |
| Sum of $P_2O_5 + B_2O_3 + GeO_2$ | 20.0 to 35.0% | 22.0 to 33.0% |
| $Li_2O$ | 0 to 5.0% | 0 to 3.0% |
| $Na_2O$ | 3.0 to 14.0% | 4.0 to 13.0% |
| $K_2O$ | 0 to 9.0% | 0 to 8.0% |
| Sum of $Li_2O + Na_2O + K_2O$ | 5.0 to 15.0% | 7.0 to 13.0% |
| $Nb_2O_5$ | 2.0 to less than 22.0% | 2.5 to 21.5% |
| $Bi_2O_3$ | 34.0 to 60.0% | 36.0 to 59.0% |
| $WO_3$ | 0 to 5.0% | 0 to 3.0% |
| BaO | 0 to 5.0% | 0 to 3.0% |
| $In_2O_3$ | 0 to 7.0% | 0 to 5.0% |

The reasons for limiting the composition range (% should be taken as those by weight unless otherwise indicated) of each component of the optical glass according to the present invention are as follows:

$P_2O_5$ is an essential component for the optical glass according to the present invention and a main component for composing a network structure of the glass, which is present in a proportion of 15.0 to 29.0%, since if more than 29.0%, the high refractive index and high dispersion cannot be maintained while if less than 15.0%, the devitrification tendency is increased to render the glass unstable. The preferred range is 16.0 to 28.0%.

$B_2O_3$ is an optional component but an effective component for composing a network structure similar to $P_2O_5$ and rendering uniform the glass using in a suitable amount, which is present in a proportion of 0 to 2.0%, since if more than 2.0%, the aimed refractive index and yield temperature (At) are hard to obtain to render the glass unstable. The preferred range is 0 to 1.0%.

$GeO_2$ is an optional, but very effective component for composing a network structure similar to $P_2O_5$ and increasing the refractive index of the glass. If the amount of $GeO_2$ exceeds 14.0%, the yield temperature (At) is increased. Because of the expensive raw material, use of this material in a large amount is not so realistic for the mass production. Accordingly, the content of $GeO_2$ is in a range of 0 to 14.0%, preferably 0 to 13.5%.

When the sum of $P_2O_5+B_2O_3+GeO_2$ exceeds 35.0%, the previously aimed refractive index and yield temperature (At) are hard to obtain and when less than 20.0%, the glass becomes unstable. Accordingly, the sum of $P_2O_5+B_2O_3+GeO_2$ should be in a range of 20.0 to 35.0%, preferably 22.0 to 33.0%.

$Li_2O$ is an optional, but very effective component for lowering the softening point of the glass in the similar manner to $Na_2O$. If using $Li_2O$ in a suitable amount with $Na_2O$, a previously aimed low yield temperature (At) can be obtained. If exceeding 5.0%, however, the coefficient of thermal expansion of the glass is increased and correct transferring of a lens surface during precision molding is difficult, while the water resisting property is also deteriorated. Accordingly, the content of $Li_2O$ should be in a range of 0 to 5.0%, preferably 0 to 3.0%.

$Na_2O$ is an essential component for the optical glass according to the present invention and a very important component for largely contributing to the low softening and stability of the glass. If less than 3.0%, however, its effects are decreased, while if exceeding 14.0%, the water resisting property of the glass is deteriorated. Accordingly, the content of $Na_2O$ should be 3.0 to 14.0%, preferably 4.0 to 13.0%.

$K_2O$ is an optional, but very effective component for lowering the softening point of the glass in the similar manner to $Na_2O$. If using $K_2O$ in a suitable amount with $Na_2O$, a previously aimed low yield temperature (At) can be obtained. If exceeding 9.0%, however, the water resisting property of the glass is deteriorated. Accordingly, the content of $K_2O$ should be 0 to 9.0%, preferably 0 to 8.0%.

When the sum of $Li_2O+Na_2O+K_2O$ exceeds 15.0%, the glass tends to be unstable and the water resisting property of the glass is deteriorated. If less than 5.0%, the aimed low yield temperature (At) cannot be obtained. Accordingly, the sum of $Li_2O+Na_2O+K_2O$ should be in a range of 5.0 to 15.0%, preferably, 7.0 to 13.0%.

$Nb_2O_5$ is an essential component for the optical glass according to the present invention and a very effective component for attaining the aimed high refractive index, high dispersion. If less than 2.0%, however, the effects is decreased. When Nb in the glass, tending to readily be reduced, exceeds 22.0%, coloring of the glass is thickened under exposure to ultraviolet rays. Accordingly, the content of $Nb_2O_5$ should be in a range of 2.0 to 22.0%, preferably 2.5 to 21.5%.

$Bi_2O_3$ is an essential component for the optical glass according to the present invention and a very important component for lowering the yield temperature (At) in the similar manner to alkali metal oxides as well as raising the refractive index of the glass in the similar manner to $Nb_2O_5$. If less than 34.0%, however, the effect is decreased, while if exceeding 60.0%, the glass is very unstable. Accordingly, the content of $Bi_2O_3$ should be in a range of 34.0 to 60.0%, preferably 36.0 to 59.0%.

$WO_3$ is an optional component but an effective component for attaining the aimed high refractive index, high dispersion properties according to the present invention, similar to $Nb_2O_5$, and when W in the glass, tending to be readily reduced, exceeds 5.0%, coloring of the glass is thickened under exposure to ultraviolet rays. Accordingly, the content of $WO_3$ should be in a range of 0 to 5.0%, preferably 0 to 3.0%.

BaO is an optional component but an effective component for improving the solubility and stability of the glass. If the content of BaO exceeds 5.0%, however, a previously aimed low yield temperature (At) is hard to obtain. Accordingly, the content of BaO should be in a range of 0 to 5.0%, preferably 0 to 3.0%.

$In_2O_3$ is an optional component but an effective component for controlling the refractive index of the glass. If the content of $In_2O_3$ exceeds 7.0%, however, a previously aimed low yield temperature (At) is hard to obtain and the glass is unstable. Accordingly, the content of $In_2O_3$ should be in a range of 0 to 7.0%, preferably 0 to 5.0%.

In the optical glass of the present invention, in addition to the above described components, $ZrO_2$, $Ta_2O_5$, $Ga_2O_3$, MgO, ZnO, CaO, SrO, etc. can be incorporated for the purpose of controlling the optical constants, improving the melting property and increasing the stability of the glass without departure from the scope of the present invention, but in order to obtain a good quality glass in agreement with the above described objects, it is desirable not to incorporate the above described components.

Production of the optical glass according to the present invention is carried out by weighing and mixing the corresponding raw material compounds so that a predetermined proportion of the object composition is given, for example, oxides, hydroxides, carbonates, nitrates and phosphates, adequately blending these materials, charging the resulting mixture in a platinum crucible, melting in an electric furnace at a temperature of 900 to 1200° C. with suitable agitation to render homogeneous, cleaning and casting the mixture in a preheated metallic mold at a suitable temperature and then gradually cooling. A small amount of a defoaming agent such as $Sb_2O_3$, etc. can further be added.

The following examples are given in order to illustrate the present invention in detail without limiting the same.

EXAMPLES 1 to 8

Examples of compositions (weight %) of the optical glass according to the present invention and their characteristic values of refractive index (nd), Abbe number (vd) and yield temperature (At) are shown in Table 1. The yield temperature (At) was measured by the use of a thermomechanical analyzer (TMA) in the case of raising the temperature at 5° C. per minute.

Optical glasses of this Example were prepared by using the corresponding oxides, hydroxides, carbonates, nitrates and phosphates as raw materials for each component, weighing these materials to give proportions of compositions as shown in Table 1, adequately mixing, then charging in a platinum crucible, melting in an electric furnace at 900 to 1200° C., stirring the mixture at a suitable time to render homogeneous, cleaning, then casting in a metallic mold preheated at a suitable temperature and gradually cooling to prepare an optical glass of each Example.

Then, a glass block with a predetermined weight was cut out of the resulting glass, polished in a columnar shape in conventional manner and subjected, as a preform, to precision molding to obtain several lens articles. These lenses exhibited good transferring property and there was found no adhesion of the glass and evaporated matters to a mold material.

TABLE 1

|  |  | Example 1 | Example 2 | Example 3 | Example 4 | Example 5 | Example 6 | Example 7 | Example 8 |
|---|---|---|---|---|---|---|---|---|---|
| Composition | $P_2O_5$ | 16.97 | 27.51 | 26.45 | 20.90 | 19.29 | 22.18 | 19.60 | 17.66 |
|  | $B_2O_3$ | — | — | 0.48 | — | — | — | — | — |
|  | $GeO_2$ | 11.78 | — | — | 4.24 | 13.40 | — | 10.82 | 12.26 |
|  | $Li_2O$ | — | 2.90 | 2.83 | — | — | — | — | — |
|  | $Na_2O$ | 4.20 | 4.83 | 4.72 | 4.35 | 4.77 | 12.91 | 4.66 | 4.37 |
|  | $K_2O$ | 3.34 | — | — | 7.26 | 3.80 | — | 4.22 | 3.48 |
|  | BaO | 2.51 | 2.90 | 2.83 | — | 2.86 | — | 2.79 | 2.62 |
|  | $Nb_2O_5$ | 2.38 | 20.65 | 21.94 | 21.08 | 17.43 | 21.71 | 19.89 | 7.87 |
|  | $Bi_2O_3$ | 58.82 | 36.35 | 40.75 | 42.17 | 35.88 | 43.11 | 35.02 | 51.74 |
|  | $WO_3$ | — | — | — | — | 2.57 | — | — | — |
|  | $In_2O_3$ | — | 4.86 | — | — | — | — | 3.00 | — |
| Characteristic | nd | 1.85946 | 1.83339 | 1.85520 | 1.84774 | 1.83104 | 1.83103 | 1.83674 | 1.88828 |
| Values | vd | 24.2 | 25.92 | 24.28 | 23.41 | 25.22 | 24.84 | 24.95 | 22.46 |
|  | At/° C. | 435 | 486 | 477 | 505 | 515 | 479 | 536 | 465 |

COMPARATIVE EXAMPLES 1 to 5

Glasses of Comparative Examples 1 to 5 correspond to those of Examples 7 to 11, as the second embodiment of the invention described in JP-A-8-157231. In Table 2 are shown the refractive index (nd), Abbe number (vd), yield temperature (At) (which the inventors have really measured) and coloration (which refers to wavelengths exhibiting transmittance of 70% and 5%, represented as a unit of 10 nm through rounding at a decimal place) of these glasses. The measurement method and indication method of the coloration are according to Measurement Method of Coloration of Optical Glass in Japanese Optical Glass Industrial Standards (JOGIS 02-1975).

Generally, the higher is the refractive index of the glass, the larger is the reflectivity for light, so that the glass is seen colored in yellow with the naked eye. When $TiO_2$ is incorporated as a glass component, furthermore, sharp absorption appears in the short wavelength zone and consequently, the resulting glass is further strongly colored. Since all the glasses of Comparative Examples 1 to 5 contain TiO₂, as shown in Table 2, the coloration thereof all exhibit larger values than those of Example 8 in which highest refractive index, highest dispersion and strongest coloration were given. As exemplified in FIG. 1, the coloration of Example 8 according to the present invention and Comparative Example 3 are respectively 42/36 and 50/38 and the glass of Comparative Example 3 is not preferable as an optical glass for use, because of being more strongly colored than that of Example 8.

Furthermore, it is well known that when TiO₂ is incorporated in a glass composition, high refractive index, high dispersion properties of the glass composition can readily be obtained. However, the glass containing TiO₂ tends to exhibit a high yield temperature (At) as apparent from the data of Comparative Examples showing higher yield temperatures (At) than those of Examples of the present invention. In particular, the glass of Comparative Example 5, having the similar high refractive index, high dispersion properties to those of the present invention as claimed, exhibited a very high yield temperature (At), i.e. 595° C. This can be considered due to that in the composition system of Comparative Examples 1 to 5 (P₂O₅—B₂O₃—Nb₂O₅—WO₃-alkali metal oxides system), it is difficult to incorporate GeO₂ considered very effective for increasing the refractive index therein so as to readily obtain high refractive index, high dispersion properties and accordingly, there is no way but adding TiO₂ in addition to the essential components. That is, JP-A-8-157231 discloses that in the composition system of P₂O₅—B₂O₃—Nb₂O₅—WO₃-alkali metal oxide, it is difficult to maintain the high refractive index, high dispersion properties so long as TiO₂ is not added. In the glass of P₂O₅—Nb₂O₅—Bi₂O₃—Na₂O system the present invention proposes, however, GeO₂ can be incorporated while maintaining the low softening property, as shown in Examples and it is rendered easy to achieve a high refractive index.

Based on the above described reasons, any of the glasses of Comparative Examples 1 to 5 cannot be put to practical use for precision molding.

Comparative Example 6

Comparative Example 6 corresponds to a glass of Example 14 according to an invention described in JP-A-2001-058845. The coloration (transmittance) of the optical glasses of Example 8 according to the present invention and Comparative Example 6 before and after irradiation of ultraviolet rays was measured to obtain results as shown in FIG. 2. An ultraviolet ray with a wavelength of 365 nm was irradiated with an intensity of 1000 mW/cm² for 1 hour.

FIG. 2(a) is a curve showing the coloration (transmittance) of the glass of Example 8 before UV irradiation, (b) the glass of Example 8 after UV irradiation, (c) the glass of Comparative Example 6 before UV irradiation and (d) the glass of Comparative Example 6 after UV irradiation.

It will clearly be understood from these results that the glass of Example 8 gives a smaller change in transmittance even after irradiation of ultraviolet rays, while the glass of Comparative Example 6 shows a large change in transmittance i.e. large coloration after irradiation of ultraviolet rays.

TABLE 2

| | | Example 8 | Comparative Example 1 | Comparative Example 2 | Comparative Example 3 | Comparative Example 4 | Comparative Example 5 | Comparative Example 6 |
|---|---|---|---|---|---|---|---|---|
| Composition | P₂O₅ | 17.66 | 18.4 | 23.9 | 23.4 | 23.8 | 27.8 | 23.0 |
| | B₂O₃ | — | 12.5 | 5.6 | 5.6 | 2.6 | 2.6 | — |
| | SiO₂ | — | 2.0 | — | 3.0 | — | — | — |
| | GeO₂ | 12.26 | — | — | — | — | — | — |
| | Li₂O | — | 1.5 | 1.0 | 1.0 | 3.0 | 2.0 | 3.0 |
| | Na₂O | 4.37 | 10.3 | 9.5 | 9.5 | 5.7 | 6.7 | 8.0 |
| | K₂O | 3.48 | — | 7.0 | 7.0 | 1.5 | 2.5 | — |
| | TiO₂ | — | 5.0 | 9.2 | 9.2 | 3.6 | 8.6 | — |
| | Nb₂O₅ | 7.87 | 37.7 | 33.8 | 36.8 | 38.3 | 39.8 | 38.0 |
| | WO₃ | — | 8.6 | 7.0 | 3.0 | 9.0 | 5.0 | 12.0 |
| | BaO | 2.62 | 0.2 | — | — | 12.3 | 5.0 | 6.0 |
| | | Bi₂O₃ 51.74 | | SrO 3.0 | MgO 1.5 | As₂O₃ 0.2 | | Bi₂O₃ 10.0 |
| Characteristic Values | nd | 1.88828 | 1.77071 | 1.77945 | 1.77486 | 1.82818 | 1.83852 | 1.84736 |
| | vd | 22.46 | 24.4 | 26.3 | 24.1 | 24.3 | 21.1 | 23.6 |
| | At/° C. | 465 | 558 | 549 | 564 | 555 | 595 | 525 |
| | Coloration | 42/36 | 49/38 | 47/38 | 50/38 | 43/38 | 49/38 | 43/38 |

ADVANTAGES OF INVENTION

According to the present invention, the glass, the inventors have already proposed in JP-A-10-316448, are largely improved to lower the softening point thereof like lead oxide, tellurium oxide, etc. and on the other hand, there can be provided a high refractive index, high dispersion optical glass for precision molding, containing no harmful components to the ambient environment and health and having excellent properties, i.e. yield temperature (At) of at most 550° C., refractive index (nd) of at least 1.83 and Abbe number (vd) of at most 26.0 and further providing a low softening property as well as an improved mass production property with less coloration by ultraviolet rays.

What is claimed is:

1. A high refractive index, high dispersion optical glass for precision molding, having a yield temperature (At) of at most 550° C., refractive index (nd) of at least 1.83 and Abbe number (vd) of at most 26.0, which is represented, in terms of atoms for making up the glass, by the following chemical composition (wt %):

| | |
|---|---|
| P₂O₅ | 15 to 29% |
| B₂O₃ | 0 to 2% |
| GeO₂ | 0 to 14% |
| Sum of P₂O₅ + B₂O₃ + GeO₂ | 20 to 35% |

-continued

| | |
|---|---|
| Li$_2$O | 0 to 5% |
| Na$_2$O | 3 to 14% |
| K$_2$O | 0 to 9% |
| Sum of Li$_2$O + Na$_2$O + K$_2$O | 5 to 15% |
| Nb$_2$O$_5$ | 2 to less than 22% |
| Bi$_2$O$_3$ | 34 to 60% |
| WO$_3$ | 0 to 3.0% |
| BaO | 0 to 5% |
| In$_2$O$_3$ | 0 to 7%. |

2. A high refractive index, high dispersion optical glass for precision molding, having a yield temperature (At) of at most 550° C., refractive index (nd) of at least 1.83 and Abbe number (vd) of at most 26.0, which is represented, in terms of atoms for making up the glass, by the following chemical composition (wt %):

| | |
|---|---|
| P$_2$O$_5$ | 16 to 28% |
| B$_2$O$_3$ | 0 to 1% |
| GeO$_2$ | 0 to 13.5% |
| Sum of P$_2$O$_5$ + B$_2$O$_3$ + GeO$_2$ | 22 to 33% |
| Li$_2$O | 0 to 3% |
| Na$_2$O | 4 to 13% |
| K$_2$O | 0 to 8% |
| Sum of Li$_2$O + Na$_2$O + K$_2$O | 7 to 13% |
| Nb$_2$O$_5$ | 2.5 to 21.5% |
| Bi$_2$O$_3$ | 36 to 59% |
| WO$_3$ | 0 to 3% |
| BaO | 0 to 3% |
| In$_2$O$_3$ | 0 to 5%. |

* * * * *